Dec. 11, 1928.  
G. W. ELMEN  
1,695,041  
PRODUCTION OF MAGNETIC DUST CORES  
Filed Dec. 17, 1926

Inventor:  
Gustaf W. Elmen  
by Elmer V. Griggs  
Attorney

Patented Dec. 11, 1928.

1,695,041

UNITED STATES PATENT OFFICE.

GUSTAF W. ELMEN, OF LEONIA, NEW JERSEY, ASSIGNOR TO BELL TELEPHONE LABORATORIES, INCORPORATED, OF NEW YORK, N. Y., A CORPORATION OF NEW YORK.

PRODUCTION OF MAGNETIC DUST CORES.

Application filed December 17, 1926. Serial No. 155,509.

This invention relates to the production of magnetic dust structures.

In accordance with this invention magnetic particles of spherical shape are employed in place of the particles of irregular shape heretofore used in the manufacture of magnetic dust cores and similar magnetic structures.

The magnetic particles of spherical shape are preferably produced by projecting molten magnetic metal in the form of a spray into a cooling medium whereby the individual molten particles are cooled and coalescence between adjacent particles is prevented. A Schoop's pistol may be used for this purpose, the molten spray being directed into a cooling bath such as water. The magnetic dust so produced is spherical in form and can be insulated and compressed into a coherent magnetic structure with a minimum of damage to the insulation on the particles. A magnetic structure is thus obtained having high resistance to eddy currents.

An added advantage of this process is that magnetic materials having structural characteristics which would prevent them from being reduced to a finely divided state by the ordinary methods of grinding and rolling can readily be produced by this process.

Figure 1:
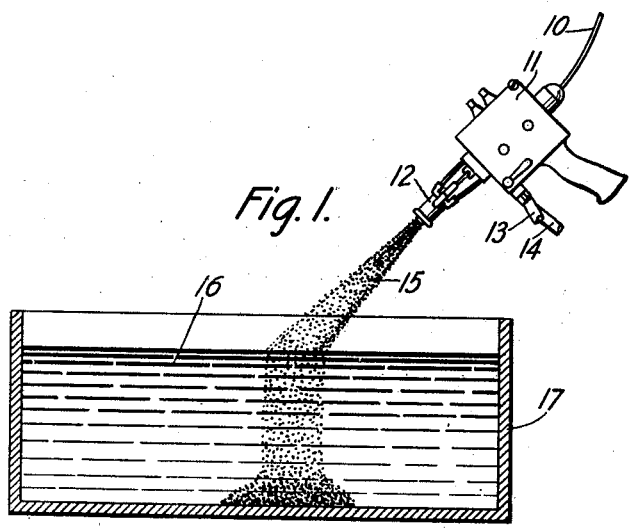
Figure 2:
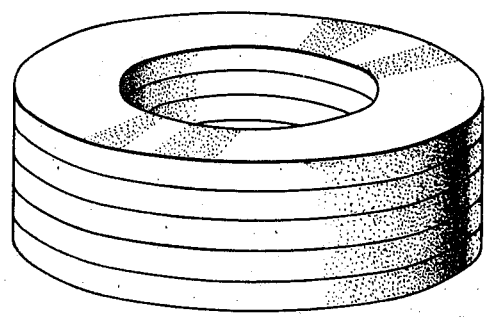

A more detailed description of the invention follows and is illustrated in the accompanying drawing in which:

Fig. 1 shows the preferred method of producing metallic dust in accordnace with this invention; and Fig. 2 is a perspective view of a magnetic core for electrical coils formed from dust produced according to this invention.

Referring to Fig. 1 a metallic mass of metal 10, such as nickel, iron, or alloys of nickel and iron, and nickel, iron and cobalt, preferably in wire form, is heated to a liquid state in a Schoop's pistol. This pistol comprises a casing 11 enclosing a feeding mechanism (not shown) to which the wire 10 is supplied. The metallic wire enters a nozzle 12 and is melted to a liquid state by an oxyacetylene or oxy-hydrogen flame formed by the combustion of these gases supplied to the pistol through the pipe lines 13 and 14. The metal is projected from the nozzle 12 in an atomizing spray 15 of finely-divided molten particles. The fine molten particles pass through a cooling medium 16, such as water, contained in a tank 17 and are cooled to prevent coalescence between adjacent particles. The metallic particles fall to the bottom of the tank where they are collected. They are then removed and dried. Under microscopic examination metallic dust produced by this method is spherical in form, and substantially more than 50% can be passed through a 200 mesh screen.

After removing the metallic dust from the cooling bath, the particles are heated in an oxidizing atmosphere to form an insulating oxide on the minute particles, or the particles are dried and coated with other insulating material. A mass of the insulated particles is placed in an annular mold and compressed under extremely high pressures into core sections which may be built up into a magnetic core structure, such as is shown in Fig. 2. A more detailed description of the method of forming magnetic cores is disclosed in G. W. Elmen Patent 1,286,965, issued December 10, 1918.

The insulated spherical metallic dust may be subjected to pressures higher than 200,000 pounds per square inch, and although the individual particles are deformed from their original spherical shape, the insulating coating thereon is not punctured, due to the absence of sharp edges on the particles. Therefore, the high specific resistance of the magnetic core is more easily maintained than in dust cores of usual structure.

While in the method of producing spherical dust described above, the use of a Schoop's pistol is preferred for melting and spraying the molten particles, other means may be used to accomplish the same result. Furthermore, other metals than those mentioned may be reduced to spherical dust form by the above method.

What is claimed is:

1. A magnetic structure comprising a mass of particles of magnetic material substantially all of which have a continuous curved surface, insulated and compressed to form a coherent structure.

2. A magnetic structure comprising a mass of spherical particles of magnetic material compressed to form a coherent structure, said particles being separated by a continuous film of insulating material.

3. A magnetic core comprising finely divided spherical particles of an alloy containing nickel and iron, and an insulating coating on the individual particles.

4. A magnetic structure comprising a mass of insulated particles of magnetic material substantially all of which have a continuous curved surface compressed to form a coherent structure, said particles being separated by a continuous film of insulating material, whereby high resistance against eddy currents is secured.

5. A magnetic core comprising a compressed mass of finely divided substantially spherical particles of an alloy containing nickel and iron and an insulating oxide on the individual particles.

6. The method of making a magnetic structure which comprises producing finely divided spherical metallic particles, coating the particles with insulating material and subjecting the coated particles to pressure.

7. The method of making a magnetic structure which comprises producing finely divided spherical magnetic particles, coating the particles with insulating material and subjecting the coated particles to sufficient pressure to deform them.

8. The method of making magnetic cores which comprises producing finely divided spherical metallic magnetic particles, coating the particles with insulating material, and submitting a mass of said particles to pressure sufficient to compress the mass into a self-sustaining solid.

9. The method of making magnetic cores which comprises producing spherical metallic magnetic particles, coating said particles with an insulating oxide, and compressing a mass of said particles into a solid in which the particles are deformed, whereby injury to the insulating coating is substantially eliminated.

10. The method of producing a coherent magnetic structure of comminuted magnetic material which comprises forming from a stock of magnetic material, particles which are substantially spherical in shape, oxidizing the individual particles, and subjecting a mass of particles to high pressure to form a self-sustaining solid.

11. The method of producing a magnetic core which requires heat treatment to improve its magnetic properties, which comprises producing finely divided spherical particles from a mass of magnetic material, forming an insulating coating on the individual particles, subjecting a mass of coated particles to high pressure to form a homogeneous solid, and heat treating said solid at a high temperature.

In witness whereof, I hereunto subscribe my name this 14th day of December A. D., 1926.

GUSTAF W. ELMEN.